(12) United States Patent
Pellinen

(10) Patent No.: US 11,615,635 B2
(45) Date of Patent: Mar. 28, 2023

(54) HEURISTIC METHOD FOR ANALYZING CONTENT OF AN ELECTRONIC DOCUMENT

(71) Applicant: VUOLEARNING LTD, Espoo (FI)

(72) Inventor: Otto Pellinen, Espoo (FI)

(73) Assignee: VUOLEARNING LTD, Espoo (FI)

( * ) Notice: Subject to any disclaimer, the term of this patent is extended or adjusted under 35 U.S.C. 154(b) by 407 days.

(21) Appl. No.: 16/955,177

(22) PCT Filed: Dec. 21, 2018

(86) PCT No.: PCT/FI2018/050962
§ 371 (c)(1),
(2) Date: Jun. 18, 2020

(87) PCT Pub. No.: WO2019/122532
PCT Pub. Date: Jun. 27, 2019

(65) Prior Publication Data
US 2020/0364452 A1 Nov. 19, 2020

(30) Foreign Application Priority Data
Dec. 22, 2017 (FI) .................................. 20176151

(51) Int. Cl.
*G06F 40/30* (2020.01)
*G06N 7/00* (2023.01)
(Continued)

(52) U.S. Cl.
CPC ............ *G06V 30/414* (2022.01); *G06F 40/30* (2020.01); *G06N 7/00* (2013.01); *G06V 30/418* (2022.01)

(58) Field of Classification Search
CPC .... G06V 30/414; G06V 30/418; G06F 40/30; G06F 40/216; G06F 40/103; G06F 16/353; G06F 40/151; G06F 40/258; G06N 7/00
See application file for complete search history.

(56) References Cited

U.S. PATENT DOCUMENTS 6,377,704 B1  4/2002  Cooperman
8,539,342 B1  9/2013  Lewis
(Continued)

FOREIGN PATENT DOCUMENTS

WO      02056196 A2   7/2002
WO   2015003245 A1   1/2015

OTHER PUBLICATIONS

Gao, Liangcai et al. Newspaper article reconstruction using ant colony optimization and bipartite graph. In: Applied Soft Computing, [online] EPOQUENET XPESP. Amsterdam, NL: Elsevier, Jul. 21, 2012, vol. 13, No. 6, pp. 3033-3046, [retrieved on Aug. 7, 2018], Retrieved from <EPOQUENET XPESP>, <DOI:10.1016/j.asoc.2012.07.012> abstract; sections 1,2.3, 3.1, 4-6, 7.1; figures 1-2.
Xi, Jie et al. Page segmentation of Chinese newspapers. In: Pattern Recognition. [online] EPOQUENET XPESP. GB Elsevier, Dec. 1, 2012, vol. 35, No. 12, pp. 2695-2704, ISSN 0031-3203, [retrieved on Aug. 7, 2018]. Retrieved from <EPOQUENET XPESP>, <DOI:10.1016/S0031-3203(01)00248-5> abstract; sections 2, 2.1, 2.3-2.4, 3.2; figures 2-3, 5-7.
(Continued)

*Primary Examiner* — Tan H Tran
(74) *Attorney, Agent, or Firm* — Robert P. Michal, Esq.; Carter, DeLuca & Farrell LLP

(57) ABSTRACT

A computer implemented method configured to analyze contents of a page of a vector graphic format file includes dividing text content on the page into text blocks, pre-classifying each text block to be one of a raw body text block and a non-body text block, processing the raw body text blocks to form a plurality of body text blocks and combining the body text blocks into a text flow including the plurality of body text blocks. The method further includes defining a semantical role of each of the non-body text blocks, and combining the non-body text blocks among the body text
(Continued)

blocks of the text flow in a geometrical order. Result data is provided, formatted as any one of a data structure and a data stream, the result data including text content of the page as geometrically arranged non-body text blocks and body text blocks.

11 Claims, 8 Drawing Sheets

(51) Int. Cl.
*G06V 30/414* (2022.01)
*G06V 30/418* (2022.01)

(56) References Cited

U.S. PATENT DOCUMENTS

| | | | |
|---|---|---|---|
| 9,619,445 B1 | 4/2017 | Neuberg et al. | |
| 2006/0271847 A1* | 11/2006 | Meunier | G06V 30/416 715/255 |
| 2007/0250497 A1 | 10/2007 | Mansfield et al. | |
| 2008/0107337 A1 | 5/2008 | Furmaniak et al. | |
| 2008/0107338 A1* | 5/2008 | Furmaniak | G06V 30/416 382/176 |
| 2009/0030671 A1 | 1/2009 | Kwon et al. | |
| 2010/0040287 A1 | 2/2010 | Jain et al. | |
| 2010/0174732 A1 | 7/2010 | Levy et al. | |
| 2012/0102388 A1 | 4/2012 | Fan | |
| 2013/0343658 A1 | 12/2013 | Dejean | |
| 2015/0095022 A1 | 4/2015 | Xu et al. | |
| 2016/0055413 A1 | 2/2016 | Popov et al. | |
| 2016/0140145 A1* | 5/2016 | Bruno | G06F 40/106 715/201 |
| 2016/0314104 A1 | 10/2016 | Phillips et al. | |
| 2018/0373686 A1* | 12/2018 | Pittman | G06F 40/106 |

OTHER PUBLICATIONS

Chen, Su et al. Extraction of text lines and text blocks on document images based on statistical modeling. In: International Journal of Imaging Systems and Technology. Wiley Online Library John Wiley & Sons Inc [online], Winter 1996, vol. 7, No. 4, pp. 343-356, [retrieved on Aug. 8, 2018]. Retrieved from <https://onlinelibrary.wiley.com/doi/abs/10.1002/%28SICI%291098 -1098%28199624%297%3A4%3C343%3A%3AAID-IMA9%3E3.0.CO%3B2-8>, <DOI: 10.1002/(SICI)1098-1098(199624)7:4<343::AID-IMA9>3.0.CO;2-8> abstract; p. 350, right column; p. 353, right column; figures 6, 11-13, 15e, 15f.

Finnish Search Report issued by the Finnish Patent and Registration Office in relation to Finnish Application No. 20176151 dated Aug. 18, 2018 (3 pages).

International Search Report issued by the European Patent Office acting as the International Searching Authority in relation to International Application No. PCT/FI2018/050962 dated Apr. 11, 2019 (5 pages).

Written Opinion of the International Searching Authority issued by the European Patent Office acting as the International Searching Authority in relation to International Application No. PCT/FI2018/050962 dated Apr. 11, 2019 (8 pages).

Second Written Opinion of the International Searching Authority issued by the European Patent Office acting as the International Preliminary Examining Authority in relation to International Application No. PCT/FI2018/050962 dated Nov. 8, 2019 (7 pages).

Notification of Transmittal of the International Preliminary Report on Patentability issued by the European Patent Office acting as the International Preliminary Examining Authority in relation to International Application No. PCT/FI2018/050962 dated Jan. 30, 2020 (8 pages).

* cited by examiner

HEURISTIC METHOD FOR ANALYZING CONTENT OF AN ELECTRONIC DOCUMENT

CROSS-REFERENCE TO RELATED APPLICATIONS

This application is a national phase entry under 35 U.S.C. 371 of PCT International Application PCT/FI2018/050962 filed Dec. 21, 2018, which claims priority to Finnish Patent Application No. 20176151, filed Dec. 22, 2017, the disclosure of each of these applications is expressly incorporated herein by reference in their entirety.

FIELD

The present invention relates to a computer-implemented method, a data-processing system and a computer program product related to processing electronic documents created using a vector graphic format. More particularly, the invention relates to a computer implemented method, a data-processing system and a computer program product that utilize statistical characteristics of text on at least one entire page of an electronic document for heuristically generating a result data structure which is geometrically arranged to enable easy typesetting, editing or reuse of the contents of the original document.

BACKGROUND

Vector graphic format is a file format used to present electronic documents. A well-known example of such vector graphic format is the portable document format (PDF). Other examples are, for example, PostScript, Scalable Vector Graphics (SVG) and Encapsulated PostScript (EPS).

A vector graphic formatted document, in other words a computer file created and stored using a vector graphic format, such as the PDF format, can accurately preserve the visual appearance of electronic documents across application software, hardware, and operating systems, making it a widely used format for document sharing and archiving. A vector graphic document may be displayed or printed maintaining the original looks independent of the used software or hardware. The vector graphic format encapsulates in the vector graphic format file a description of a fixed-layout flat document, including the text, fonts, graphics and other information needed to display it. A vector graphic document contains a list of instructions for drawing objects such as geometric shapes, images and text on a 2D plane. When the document is drawn on a screen or printed, each object is rendered one by one and positioned according to their X and Y coordinates, and possibly other display information, such as font type and size for text. When the position of two objects overlap, the object rendered later will be drawn on the previous object. However, a vector graphic format does not maintain logical structures of document content, such as words, paragraphs, titles, and captions. The lack of structural information can make it difficult to reuse and repurpose the digital content represented by a vector graphic format document.

However, in many occasions it would be beneficial to be able to easily reuse digital content of a vector graphic formatted document. For example, the text may be needed for typesetting, for editing or for reuse.

The method provided herein for extracting logical structures from vector graphic format documents has many applications.

DESCRIPTION OF THE RELATED ART

U.S. Pat. No. 9,619,445 B1 discloses a semi-automated solution for defining semantic attributes for electronic publication formatted content, in which a user is provided with a graphic user interface with which he chooses a specific element of a document and sets a semantic role for it and elements with same properties.

US patent application 20120102388 A1 discloses an algorithm for segmenting text from a portable document format (PDF) document. Decision on grouping line segments into text blocks uses a local homogeneity measure. This type of algorithm may be used for defining a geometrical order for the textual content of the PDF document.

U.S. Pat. No. 8,539,342 B1 discloses a method for reconstructing the natural reading order by using an ordered tree structure.

US patent application 20070250497 A1 discloses a method for determining a semantic relationship based on cluster analysis.

US patent application 20130343658 A1 discloses a method for finding tables in document by finding regular geometric structures fulfilling specific conditions.

SUMMARY

An object is to provide a method, a system and a computer program product so as to solve the problem of extracting logical structure of a vector graphic format document. The objects of the present invention are achieved with a method according to the characterizing portion of claim 1. The objects of the present invention are further achieved with a data-processing device or system and a computer program product configured to perform the method.

The preferred embodiments of the invention are disclosed in the dependent claims.

According to a first aspect, a computer implemented method for analyzing contents of a page of a vector graphic format file is provided. The method comprises dividing text content on the page into text blocks, pre-classifying each text block to be one of a raw body text block and a non-body text block, processing the raw body text blocks to form a plurality of body text blocks and combining the body text blocks into a text flow comprising the plurality of body text blocks. The method further comprises defining a semantical role of each of the non-body text blocks, combining the non-body text blocks among the body text blocks of the text flow in a geometrical order, and providing result data formatted as any one of a data structure and a data stream, the result data comprising text content of the page as geometrically arranged non-body text blocks and body text blocks.

According to a second aspect, the method comprises developing a statistical model, wherein the statistical model comprises information on a typical font, a typical row length and a typical deviation of the row length appearing on at least one entire page of the vector graphic format file.

According to a third aspect, the pre-classifying the text blocks comprises comparing characteristics of the text block with the statistical model.

According to a fourth aspect, the pre-classifying the text blocks comprises defining, for each row of text in the text block, a probability whether the row is part of body text, defining a probability of the text block to be part of the body text on basis of the probabilities of the rows of text in the text block, and if the text block fulfils all criteria defined for body text, pre-classifying the text block as a raw body text block, and if not, pre-classifying the text block as a non-body text block.

According to a fifth aspect, the pre-classifying the text blocks further comprises defining geometrical location of the text blocks on basis of geometrical locations of the text rows in the respective text block and storing geometrical locations of the text blocks.

According to a sixth aspect, the method further comprises classifying the body text blocks of the text flow, and if any of the body text blocks are recognized as non-body text block during the classifying, moving the respective text blocks to be handled as non-body text blocks.

According to a seventh aspect, the combining the body text blocks into a text flow comprises marking paragraph breaks within the body text blocks, removing line breaks from the body text blocks, and recognizing paragraphs split to two different body text blocks and moving any such split paragraphs to either one of the two body text blocks.

According to an eighth aspect, in case a first body text block is detected to be incomplete, and it cannot be combined to another body text block on the current page. The method further comprises comparing the first body text block to at least one second body text block on at least one of a preceding text flow, a following text flow, a preceding page and a following page, and if a matching second body text block is found, combining the first and the matching second text blocks.

According to a ninth aspect, a confirmation is requested from a user prior to combining the text blocks.

According to a tenth aspect, the method further comprises defining upper and lower geometrical limits of each body text block.

According to an eleventh aspect, a raw text order and a geometrical order of the vector graphic format file are defined prior to the pre-classification phase. A text block is determined to be non-body text block when the text block fulfils at least one of the following criteria: order of appearance of two consecutive rows in the geometrical order differs from the order of appearance of the rows in the raw text order and rows in the text blocks before and after the text block are consecutively arranged in the raw text order, font of the text block is different from the typical font of the page, and at least one row of the text block is significantly longer than the typical row length.

According to a twelfth aspect, each non-body text block is classified into any one semantic class of a main title, a subtitle, a caption, a citation, metatext, a page number, a table, an unordered list, an ordered list, pre-formatted text and a normal non-body text block, if the non-body text block is not classified as any of the above.

According to a thirteenth aspect, a text block is further pre-classified as a non-body text block when it fills at least one of following criteria: the font size is different from the typical font size, the text block comprises at least one row which have a significantly longer row length than the typical row length, the font type of the text is different from the typical font on the page, the geometrical order of the text in the text block is different from its raw text order, in other words, order of appearance of two consecutive text rows in the geometrical order differs from the order of appearance in the raw text order and rows in the text blocks before and after the text block are consecutively arranged in the raw text order, and length of all rows within the text block is smaller than the median text row length, but the column width is not restricted on both sides by a margin or a visible object such as an image, a geometric object or text, and the first row of the text block does not begin with a lower-case letter, and the last row of the text block does not end with a lower-case letter or a hyphen. The text block is pre-classified as a raw body text block if none of the above criteria is fulfilled.

According to a fourteenth aspect, a body text block is classified as any one of a caption, a subtitle, an unordered list, an ordered list, a table, pre-formatted text, a normal body text block, if the body text block is not classified as any of the above.

According to another aspect, a data-processing device or system is provided comprising means for carrying out the method according to any one of the above aspects one to fourteen.

According to yet another aspect, a computer program product is provided having instructions which when executed by a data-processing device or system cause the data-processing device or system to perform the method according to any one of above aspects one to fourteen.

The present invention is based on the idea of applying a heuristic method on analysing content of at least one entire page of the vector graphic format document for automatically processing the text on the page into a text flow comprising text blocks with defined semantical roles. The text blocks essentially correspond to the paragraphs and other semantic parts of the original vector graphic format document, thus capturing the logical structure of the vector graphic format document. The resulting semantically arranged text flow may be utilized in multiple forms. These forms comprise at least a file or similar data structure and output as a data stream. An example of a data structure is reconstructed and ordered content blocks stored in a database. An example of a data stream is a data stream provided as ordered text input for text-to-speech software. The method utilizes statistical characteristics of at least an entire page of the document for defining probabilities, which may be utilized for making decisions on classification and roles of the text blocks.

By using the entire content of a document page as basis for the statistical model and the heuristic decisions made based on it, the body text may be correctly recognized better than if only a small subsection of the document page was used for decision making. Local variation of row length is, as such, easy to recognize, but if this local variation is used for recognizing paragraphs of body text, the text becomes easily split into text blocks which are shorter than the original paragraphs, since decisions based on local variations of row length do not take into account natural variation of row length. This further causes a problem that non-body text may easily be placed within a text block which should correspond to an original paragraph. Splitting a text into too short text blocks is not, as such, a big problem. One of the main challenges is combining such short text blocks correctly into paragraphs. Exemplary problems that may arise in combining text blocks are interpreting a narrow paragraph of body text as something else than body text, interpreting a caption as a paragraph of body text and placing it between body text, and combining two unrelated columns of text. This kind of problems easily make the text in practice unusable. Prior art methods typically try to compare the geometric position of the text blocks, but do not compare row length.

The heuristic analysis performed based on contents of at least one entire document page, the contents comprising information on row length, overcomes such problems present in many existing solutions, and the result data contains body text blocks corresponding to the actual, original body text paragraphs with high success rate.

The present invention has the advantage that the semantically arranged text flow data structure, which represents well the logical structure of the original document, allows effective further processing of the contents for example by editing, typesetting and so on. The semantically arranged text flow data structure is a reconstruction of the text paragraphs of the document with semantic classification of the paragraphs and an indicative reading order. Semantical roles of the text blocks determined during the processing enable for example converting the result data into any markup-language data structure that includes information of semantical role of the text blocks.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
FIG. 1 illustrates an exemplary of a page of a vector graphic formatted document.

The term document refers to the original vector graphic format document file. In the following examples, the invention is described using a portable document format (PDF) as an example. The invention is not, however, limited to PDF format only, but the same method may be applied with any vector graphic format, provided that the document contains instructions for rendering text that consists of or is convertible to Unicode characters.

The term text block refers to a block of text originally obtained from the document and handled in the process as one logical piece. A text block is a simple collection of consecutive text lines, where latter lines are directly below the former. The terms text lines, lines, text rows and rows are exchangeable, all refer to a line of text in the original electronic document or a presentation thereof in a data format, that may be stored in a non-volatile memory, or in a volatile memory. Text blocks can be assumed to be fragments of text paragraphs or other textual elements in natural reading order. A PDF document does not, as such, include any information on text blocks, but only on text rows. However, recognizing a text block from a PDF document is a fairly simple process step. For example, the parameters for recognizing a text block may comprise a typical line spacing on the document page, such as the average or media line spacing. For improving correctness of the outcome of the text block recognition, the typical line spacing may be multiplied with a constant for obtaining suitable decision criteria. Initially obtained text blocks may be split and combined during the processing.

Although a PDF document maintains information on the rows of text, their positions and fonts as well as the order of printing, the document contains no information on which rows of text are related. There is no explicit information on whether a row below another is part of the same paragraph, or where one column ends and a second one begins, but this needs to be guessed and/or deduced on basis of the characteristics of the rows and paragraphs. Further, a PDF document does not maintain information on whether characters ending a line and characters starting the next line belong to the same word. Likewise, the document contains no information on semantic roles of the rows of text, such as body text, captions, titles or page numbers.

All above information may be deduced from the characteristics of the rows, utilizing the information provided by the document itself, and by combining the available information with heuristic suppositions of the characteristics of different semantic elements. Due to the nature of the problem, the result may not be flawless, but when in doubt, the heuristic algorithm should preferably result to a decision which is least harmful.

An additional challenge is that the PDF format may be produced from a variety of software programs. For example, a slide show presentation or an electronic newspaper with several columns may both be exported into the PDF format, but the characteristics of lines of text in the two are very different. If the heuristic suppositions of the characteristics were too strong, the solution would only be applicable to a very narrow selection of document types, whereas too few suppositions would greatly limit the amount of document types that can be automatically repurposed into a useful form.

The below described heuristic analysis method and system assume a prerequisite condition that the PDF document comprises information on text rows, their position, order of printing (drawing) and fonts. For example, the font information may comprise font name and size. For dummy PDF image documents comprising only an image of the page, the method may be utilized if the document is pre-handled by using optical character recognition to recognize contents of the text rows and characteristics of the text. The described solution does not necessarily need to produce a result that maintains original layout of the document, but the result may be a reconstruction of the text paragraphs of the document with semantic classification of the paragraphs and an indicative reading order. Alternatively, the original layout information may be included in the result file or in a database by establishing the correspondence of the originally detected rows of text and the paragraphs in the final result of the processing.

For performing the heuristic method, two different versions of the order of the text rows of the PDF document may be utilized.

A first version of the document is a so called raw version, which includes the unprocessed text rows in the order of drawing—in other words, in the order in which they appear in the source code of the pdf-file to be analyzed. The term raw text file is typically used for this format. However, the invention is not limited to representing the raw text as a specific file, but any form of storing the raw text into a computer readable form may be applicable. The term raw text thus refers to textual contents of the original PDF (or other vector graphic) document represented as plain text in a computer readable format.

A second version of the document, called as the geometrical order, in which text blocks are arranged in an order defined on basis of relative positions of selected respective corners of the blocks, and which can be produced in practice by arranging the text rows in typesetting order from up to down and from left to right (with latin alphabet text), however so that any row right below another are first combined into text blocks. A row combine criterion may be used for making the decision on whether two consecutive rows of text should be included in the same text block. For example, the row combine criterion may be checking whether the line spacing of the text is less than the average or median row height or font height (font size). In some embodiments, the row combine criterion may comprise average or median row height multiplied with a constant. The constant may be adjusted for fine-tuning the row combine decision criterion. Other reading orders (=geometrical orders) may be defined for non-latin text, if applicable. For determining whether a row is right below another the x-coordinate of the rows may be defined. If the x-coordinates of two consecutive text rows are at least partially overlapping, the later row may be deemed to be right below the upper row.

When combining text blocks into a text flow comprising paragraphs and/or columns, a block of text below another one may be combined with the one above it, if the block combine criterion defined for combining two text blocks is fulfilled. For example, two text blocks may be combined if distance between the two blocks of text is less than twice the average or median row height. Alternatively, the block combine criterion may be fine-tuned by using a decision limit obtained by multiplying the average or median row height with a multiplier. The combine criterion may comprise checking whether the two blocks should follow one another in the raw text order. This information may be indicative of whether the two consecutive text blocks represents paragraphs in the same column on in different columns, which may affect on the decision whether a text block should be combined with the first text block in the next column or with the next text block in the same column. This enables handling of for example newspaper pages, where a single page may have several independent articles. The term geometrical order refers to a representation of the document describing the contents of the original document in the geometrical order. Similar to the raw text order, the geometrical order may be stored in any computer readable format. The term geometrical order thus refers to textual contents of the original PDF (or other vector graphic) document represented in geometrical order in a computer readable format.

For generating the above described two different text versions of the pdf file, several alternatives exist. One non-limiting example is to utilize open source pdftotext library function, which produces plain text files. Like functions known in the art are equally applicable. The same pdftotext library function is capable of producing both two text versions of the pdf file simply by defining parameters for the function.

Function command

"pdftotext -raw <inputfile.pdf> rawoutput.txt"

produces a raw text file with unprocessed text rows in the order of appearance in the pdf source code, and function command "pdftotext <inputfile.pdf> output.txt"

produces a text file arranged in the reading order, which is for Latin alphabet text from top to down and from left to right. We may refer the former with the term raw text order and the latter with the term geometrical order. In other words, the term geometrical order refers to order of text rows or blocks as defined by their appearance according to their geometrical locations, preferably according location of a defined corner of each text row or text block, and the term raw text order refers to order of a raw text file with unprocessed text rows in their order of appearance in the source code. It is understood by a skilled person, that instead of dedicated text files of the above example, the raw text order and the geometrical order may be stored in various other formats than ".txt" and each can be obtained from various type of original vector graphics formatted files using for example various conversion applications, functions and/or function commands available in the market. One option is to first convert a file stored in another vector graphic format into pdf-format, and processing the contents thereof using above-mentioned pdf-functions. In a typical programming environment, the raw text order data, the geometrical order data and other data needed for performing the method may be stored temporarily in a volatile memory, for example an array or any other suitable data structure object known in computer program execution environment. The specific form of storing information relating to text rows or text blocks is not important as such, as long as the data regarding the text row or the text block is easily accessible. For text rows, the information to be stored may comprise geometric and raw text order information (for example row numbers), coordinates, fonts, information on in which text block each row of text belongs and probability of a text row to be part of body text is easily accessible. For text blocks, the information to be stored may comprise geometric and raw text order information of the text block, maximum width of the text block, font, coordinates, amount of original text rows and the reconstructed contents of the text block, and which original lines are included. Both the geometrical order and the raw text order representations comprise information on the text contents of text rows in the original PDF document page, but the order of the text rows is typically different in the two. In addition, further information on the contents of the original document, such as information on the font type and font size on each row, as well as location of each text row on the original page, may be stored for further analysis. This further information may be stored in various ways known by a skilled person.

Other example utilizes a xml-version of the contents of the document that may be generated utilizing an open source library pdftohtml. Function command "pdftohtml -xml <inputfile.pdf> xmloutput.xml"

produces a plain text xml file.

The FIG. 1 illustrates an exemplary of a page of a document, which is stored in a vector graphic format such as the well-known PDF format. The exemplary page includes body text 100, and multiple of other text blocks such a main title, various types of metatext, subtitle, captions and pre-formatted text, which may be identified as non-body text 120. The page further includes images.

Figure 2:
FIG. 2 illustrates order of the contents of the document page as appearing in a geometrical order.

The FIG. 2 illustrates order of the contents of the document page as appearing in a geometrical order. Each row of text is presented in the geometrical order in their order of appearance starting in principle from top to down and from left to right. However, rows disposed directly one below other are first combined into a text block, if the distance between two rows is small enough to fulfill the row combine criterion, for example if the distance is less than the row height. The dash line boxes indicate text blocks appearing in the geometrical order, and the order of appearance of the text rows in each text block is shown within the respective dash line box. As known by a skilled person, the geometrical order does not as such need to include any row numbers, but row numbers are used to explain the contents of the geometrical order. Large text blocks such as columns and captions may be presented as consecutive rows, in other words these text rows may appear in the geometrical order one after another. Various types of metadata may be presented on the page. Metadata disposed at the top of the page appears on the first rows 1, 2, 3, 4 and 5 in the geometrical order. A main title (rows 6-7) and a subtitle (rows 8-9) typically have larger font than the body text. The page layout may include separate distinctive letters (row 10) which actually are part of the body text. However, this kind of distinctive letters may be shown as their own row or text in the geometrical order. Body text rows 11-124, 131-172, 180-197, 198-207, like any other text on the page is presented in the geometrical order simply as individual text rows. Rows 125-126, 127-130 comprise text of the captions are presented in the geometrical order at a position based on their location on the page, so that in the geometrical order the captions often reside somewhere between the body text rows. Further pre-formatted non-body text is presented in this graphical presentation with text rows 173-179, 208-226 and 227-230. It should be understood, that the term geometrical order refers to a mere text presentation of the text in the document in geometrical order. It includes the text contents of each row, but it does not as such form a full representation of the page shown in the FIG. 2, since it lacks additional information such as fonts and locations of rows needed for reproducing the original PDF document layout.

Figure 3:
FIG. 3 illustrates order of the contents of the document page as appearing in a raw text order.

The FIG. 3 illustrates order of the contents of the document page as appearing in a raw text presentation. The dash line boxes indicate text blocks appearing in the raw text, and the order of the text appearing is indicated in this illustration as row numbers for the text rows in each text block is shown within the respective dash line box. The raw text does not as such include any row numbers. In the raw text, the body text appears in this example on rows 1-115, 116-157, 158-175 and 176-185 of the raw text. The large capital letter H appearing as the first letter of the body text may be assigned its own line number 1, as the font deviates from any font used on the page. Main title has been assigned in this example row numbers 186-187, and a subtitle appears on rows 218-219. Various pieces of metadata now appear for example as rows 188, 228, 229, 220 in the raw text. Information graphics on row numbers 221-227 is one type of pre-formatted text. Rows 198-217 contain a citation from the body text and rows 195-198 contain additional information. Similar to the FIG. 2, it should be understood that the raw text is a mere text presentation of the document content including information on the text content of the page, but it does not as such form a full representation of the page as shown in the FIG. 3, since it lacks additional information such as fonts, locations of the rows needed to reproduce the original page layout.

A skilled person may easily recognize the differences in the order of the text rows in the geometrical order and the raw text order. These differences may be further used for analyzing the contents of the page in the following steps.

Figure 4:
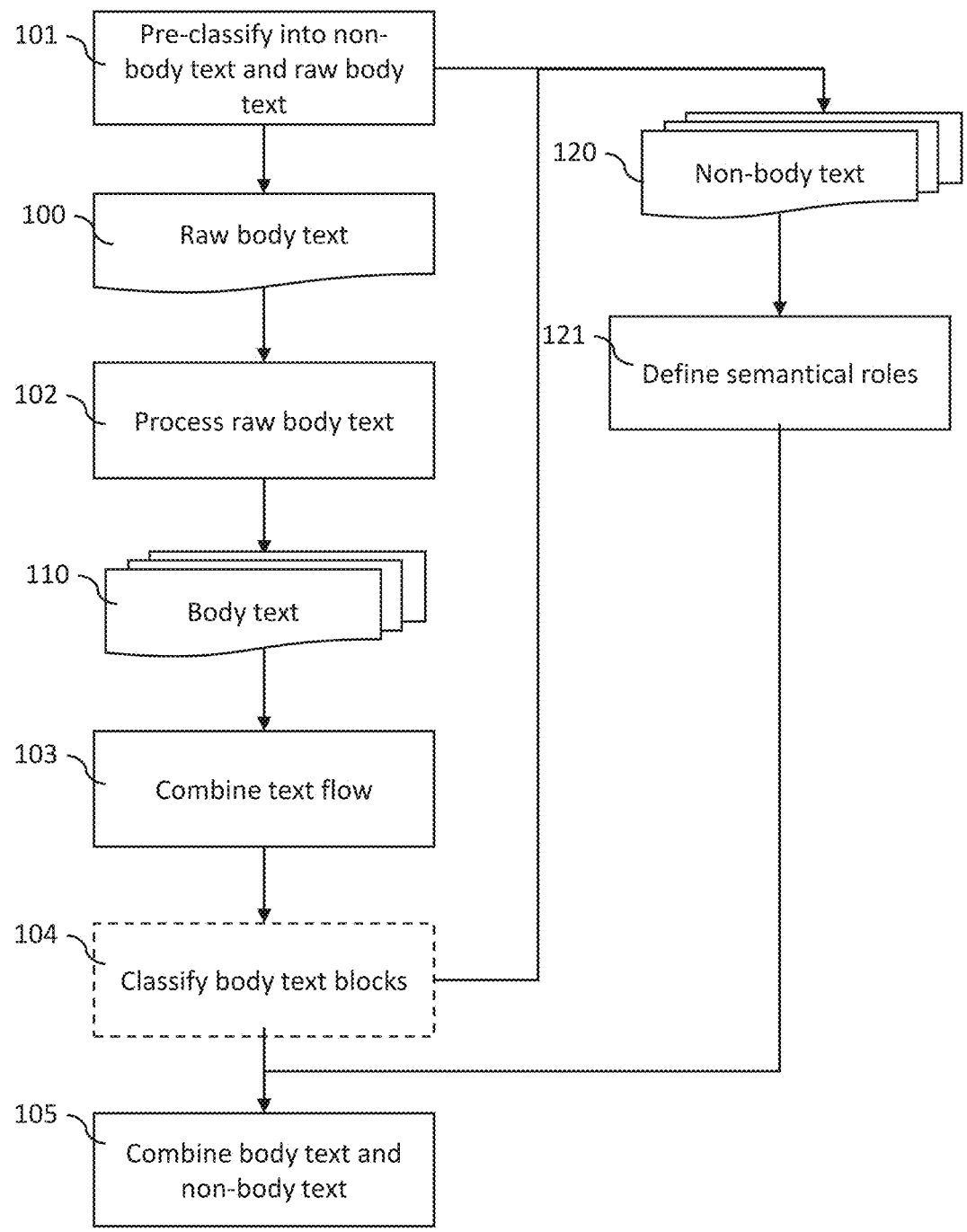
FIG. 4 illustrates an exemplary high-level outline flow chart of an embodiment.

The FIG. 4 illustrates an exemplary high-level outline flow chart of a method according to an embodiment of the invention. The process steps are preferably based on the raw text order and the geometrical order.

In the process disclosed in the FIG. 4, the content in the raw text representing the textual text contents of an entire page of the original document is logically divided into text blocks. The text blocks are first pre-classified into two categories: raw body text or non-body text. Each text block is pre-classified in the phase 101 as being one of raw body text 100 and non-body text 120. The pre-classification of text blocks into raw text blocks and non-body text blocks may be a process with multiple steps and decisions configured to enable recognizing which parts of the document are most likely part of the body text and which parts belong to the non-body text. The raw body text 100 and the non-body text 120 are then heuristically analyzed. The term raw body text refers to the text blocks initially pre-defined as part of the body text resulting from the phase 101.

The non-body text 120 is categorized by defining semantical role for each piece of non-body text in the phase 121. For example, semantical roles of the non-body text may comprise at least main titles, subtitles, captions, citations, ordered and unordered lists, tables and pre-formatted text. This type of semantical role definitions is well known in the art and widely used for example in markup languages such as Hypertext Markup Language, HTML, and Extensible Markup Language, XML. Alternatively, the semantical role may be that of metatext. Metatext provides additional information. Non-limiting examples of metatext are page numbers, publication title and other such additional information that would not typically be read out aloud.

The raw body text 100 is processed for defining logical parts of the body text. Paragraph breaks are identified within the raw body text and marked within the raw body text so that it is divided into one or more body text blocks 110 in the phase 102. Body text blocks 110 may be considered as a raw, unfinished version of division of the text content into paragraphs.

In the phase 103, body text blocks are combined into a text flow. The text flow may be considered as a raw, unfinished version of contents of the body text shown on an entire page of the document or in a column on the page of the document. For successfully combining the body text into a text flow, any non-body text 120 between the split blocks should be correctly recognized during phases 101 and 102 and moved into non-body text handling.

Phase 103 also includes but is not limited to removing any unnecessary line breaks from the body text blocks 110. If the body text blocks 110 appear to be split, body text blocks appearing to belong together are combined into one body text block 110. In addition to combining body text blocks on the current page, body text blocks that are split due to page change may be combined. For example, any sentences and/or paragraphs of the original text split between two different raw text blocks become combined into a single body text block 110 of the text flow. As a result of the above phases, the text flow preferably comprises full body text blocks which represent entire logical sentences and paragraphs.

The body text blocks of the text flow are further optionally classified in the phase 104. Optionality of this phase is illustrated with dashed line of the box of phase 104. During the optional classification phase, some body text blocks 110 initially pre-classified as body text may be reclassified as non-body text 120 and moved aside into the non-body text handling described above. However, the method may also be implemented without classifying the body text blocks 110 after the pre-classification in phase 101 without significantly deteriorating the result. In the body text classification, a body text block 110 may be classified for example into normal text, a title, an ordered or an unordered list, a table or a pre-formatted text. If a body text block 110 is not recognized as a specific type text block, for example because it does not fulfill criteria of any special class or role, it is preferably classified into a normal body text block, which represents a paragraph in the original text. Identified and classified body text blocks 110 in the text flow enable reinserting the non-body text 120 between the text blocks in the phase 105 in the geometrical order retained from the layout of the PDF document.

In the phase 105, the body text blocks 110 and semantically defined non-body text parts are combined into a rearranged result data format, which may be repurposed or reformatted with ease compared to the original PDF document.

A typical page of a document contains more body text than any other text, and column width of the body text remains often essentially constant.

Thus, a statistical approach may be chosen to pre-classify text blocks in majority of occasions. However, some special pages, such as a page with a high number of source references, may deviate from this main rule. Exceptions to the main method may be defined for special cases for handling special pages.

Figure 5:
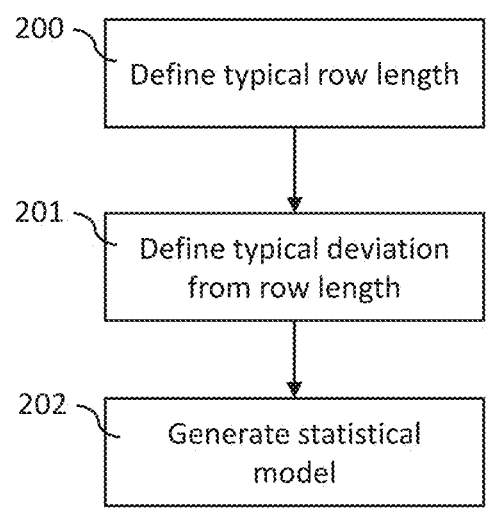
FIG. 5 illustrates an exemplary sub-process of generating a statistical model.

The FIG. 5 illustrates an exemplary sub-process of generating a statistical model that may be used at least for pre-classifying the text content.

In the phase 200, a typical row length is defined. The typical row length preferably refers to a common characteristic of text content on at least one entire page of the document, or even a common characteristic of the text content on more than one pages of the document. The term "typical row length" is preferably a statistical characteristic, and it may refer for example to a median or an average row length on the entire page or in the entire document. Alternatively, the typical row length may also be defined as a mode of the row length, which indicates the row length that appears most often in the processed text.

In addition to defining the typical row length, the most commonly used font on the page or on the row or rows representing the typical row length may be recognized and stored as the typical font.

In the phase 201, the text content is further statistically analyzed to define typical deviation of row length in comparison to the typical row length defined in the phase 200. Similar to the typical row length, the typical deviation of row length should be defined as a statistical characteristic of text on at least one entire page of the document. A non-limiting example of defining typical deviation of row length is to define standard deviation of the row length. Alternatively, quantiles may be used for indicating typical deviation. Examples of quantiles are 4-quantiles, also known as quartiles.

In the preferred embodiment, combination of median and standard deviation seems to provide the most reliable results. Standard deviation assumes a normal distribution, which is for the purposes of the embodiment a good estimate for row lengths of text in a document having a set column width.

Based on the typical row length and the typical deviation from the row length, a statistical model is generated in the phase 202, which statistical model may be used for determining, for each row of a text block, the probability of the row of text to be part of the body text and thus also the probability of the text block to be part of the body text.

The statistical model may comprise at least an upper limit for a row length that may be used to make the decision on whether text block belongs to the body text or not. The normal distribution of the row length of the document may be used as the basis for the statistical model, and the upper limit for a row length may be for example the median row length plus twice the standard deviation of the row length. In a gaussian normal distribution, about 1% of the text lines would exceed this upper limit. As a simple numerical example, the median row length may be 150 pixels, and the standard deviation may be 30 pixels. The upper limit for row length is then 150+2*30=210 pixels, and any text blocks with at least one row exceeding this upper limit may be classified as non-body text. Instead of pixels, the number of characters on a row may be used as the basis of the statistical analysis. Further, a lower limit may be defined below the median row length.

Figure 6:
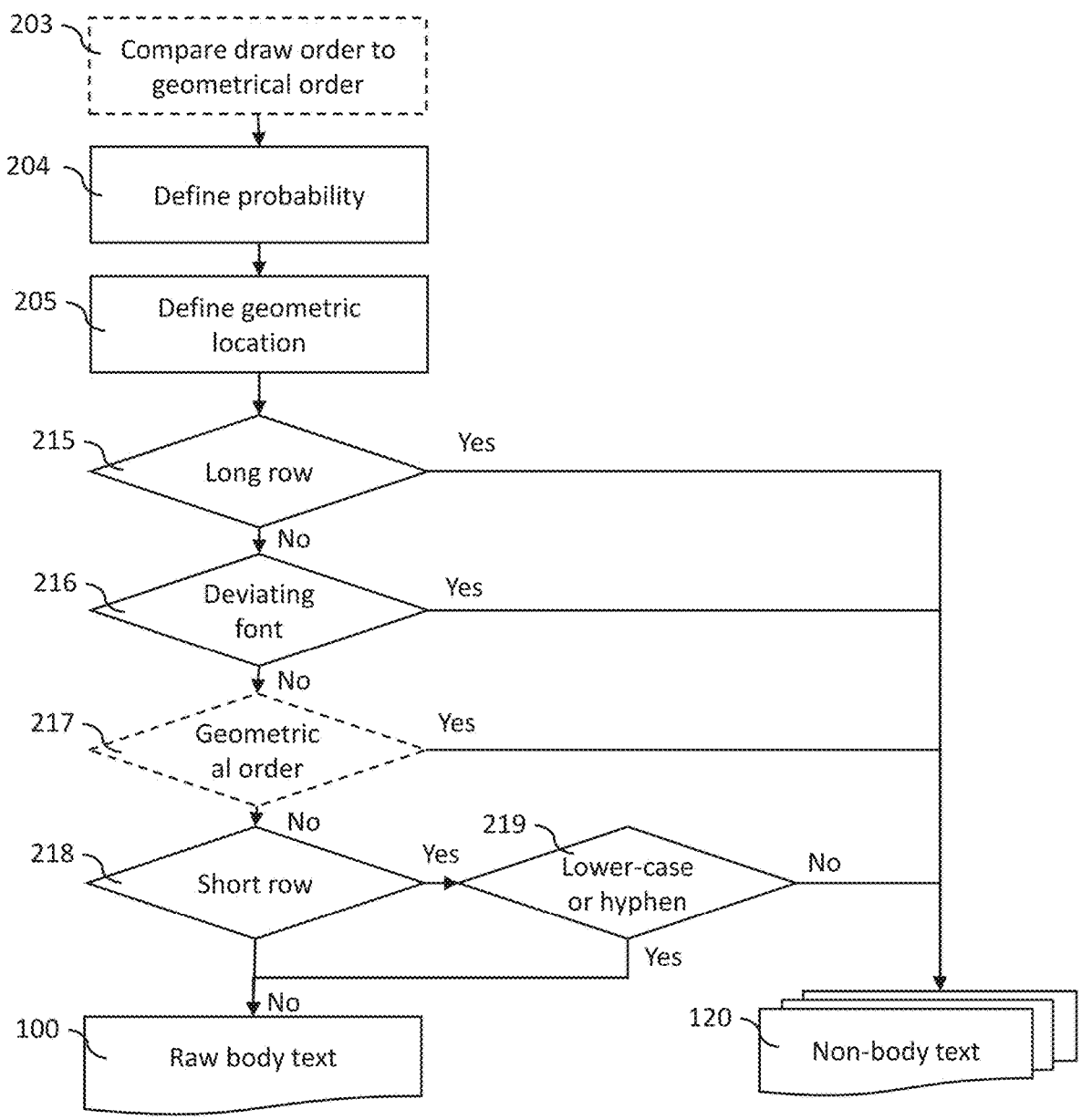
FIG. 6 illustrates an exemplary process for pre-classifying a text block to be body text block or non-body text block.

FIG. 6 illustrates an exemplary process for pre-classifying a text block to be a raw body text block 100 or a non-body text block 120. Any text block may comprise one or more rows of text.

This pre-classification is preferably preceded by the generation of the statistical model as illustrated in the FIG. 4. The same statistical model may be utilized for pre-classification of a single page of a document or multiple pages of a document. In the optional phase 203, illustrated with dashed box, the order of appearance of a text block being processed as defined in raw text and the geometrical order of the text block being processed indicated by the geometrical order are compared. If these orders appear different for the particular a text block, the text block may need to be split into more than one separate text blocks. In many cases, phase 203 may be omitted without significantly deteriorating the results.

The statistical model generated in the phases 200 to 202 may be used in the phase 204 for each row of text block to define the probability of the row of text to be part of the body text and thus also the probability of the text block to belong to the body text. According to preferred embodiment, the decision criteria for body text comprise checking, whether there is at least one too long row or the font on at least one row the text block is different from the typical font. If either of these is true, the text block is not likely to be part of body text. In other words, if the font on all rows of the text block equals with the typical font, and none of the rows exceed the upper limit for row length defined in the statistical distribution, the text block may be assumed at least preliminary to be body text. If these basic requirements are met, further parameters may be studied when making the decision on whether the text block is body text or non-body text.

In the phase 205, the geometric location of the text rows and/or text blocks are defined. The geometric location of a text row is received from the original PDF document. The geometric location of a text block may comprise geometrical limits of the text blocks, which are obtained by utilizing the stored location information of all text rows. The geometrical limits may comprise upper and lower geometrical limits of the text block, which may be obtained based on geometrical location information of the first and last text rows included in the text block. In other words, the geometrical limits may indicate the location of the upper and lower edge of the particular text block on the original PDF document page. The geometrical location may also include information on location of the left- and right-side limits of the text block. Information on the geometrical location is associated with each respective text block for further analysis.

After defining the geometrical limits, a number of pre-classification decision steps are taken, that are set to make a decision whether a text block is body text or non-body text.

A row in the body text may be shorter than average, but there are seldom any significantly longer rows in a body text block than the defined typical row length. Thus, if a text block has at least one long row, which is significantly longer than the typical row length, the text block may safely be pre-classified as non-body text, as illustrated by decision box 215. Location of the non-body text blocks is stored for future use.

Based on the defined least one limit value in the statistical model, the text blocks are pre-classified based on the row lengths in the text blocks. It may be safely assumed that any text blocks comprising at least one row that is longer than the upper limit may be classified as non-body text, but if at least one row of the text block is shorter than the lower limit, it is possible that the text block still belongs to the body text. For example, a last row in a paragraph or a narrow portion of a column due to an image may cause a body text to have at least one exceptionally short row.

If the font in the text block deviates from the typical font, the text block may be pre-classified as a non-body text, as illustrated by decision box 216. For example titles, which typically have larger font than the typical font on the page, may be also pre-classified into non-body text. Likewise, font used in captions may be different from that of the body text, and text blocks containing captions may be pre-classified as non-body text based on the font. If the font in the captions is similar to that of body text, other decision criteria is needed for recognizing captions, such as row length.

One optional decision criterion in the pre-classification is based on comparing the raw text order and the geometrical order. If the geometrical order of two rows differs from the raw drawing order indicated in the raw text order, the text block may be pre-classified as non-body text. This optional decision is illustrated by decision box 217. When the geometrical order of two consecutive rows is different from that in the raw text order, it is likely that the textual content does not continue between the two rows, but either of the rows is inserted between a text block where it doesn't belong. With different order of rows, we refer to a situation where a row appears in the raw text order earlier or later than in the geometrical order. In such case, the text blocks preceding and following the non-matching rows are included in the investigation. If rows in the text blocks before and after the one under investigation are consecutively arranged in the raw text order, the text block between the two is considered non-body text.

If at least one row in a text block is found to be clearly shorter than the typical row length, more analysis may be needed to pre-classify the text block. For example, a drawing placed between columns or within a column may reduce the row length, but the adjacent rows may still part of the body text. A text block with only rows that are short compared to the typical row length may be a body text block, if the row length is limited by a margin or one or more visible objects, such as pictures, graphical objects or other textual elements. Thus, a text block found to fulfill the short row criteria of decision box 218, in other words the text block having one or more short rows of text is only pre-classified as non-body text if the text block does not fulfill further predefined criteria of body text or if it fills further predefined criteria of non-body text, illustrated by decision box 219. For example, if the text block does not begin with a lower-case letter, the text block does not end with a lower-case letter and the text block does not end with a hyphen, it is likely to be an independent text element, such as a paragraph or one of the non-body text types, for example. Typically, it is safer to assume a block with short lines to belong to the body text if it includes at least one row that can be determined being within the defined row length limit values.

After processing all text blocks on the page according to the process illustrated in FIG. 6, the text blocks have been pre-classified into raw body text 100 or as non-body text 120. In some embodiments, further processing is based on such pre-classified text blocks only, and no further classification into body text and non-body text is required without compromising the quality of the result. In some embodiments, the pre-classified text blocks may further be re-classified into one of body text block and non-body text block during later process steps if the subsequent more detailed analysis of the text block indicates that the pre-classification was not correct. In some embodiments, the body text blocks may be further classified based on their semantic role.

Figure 7:
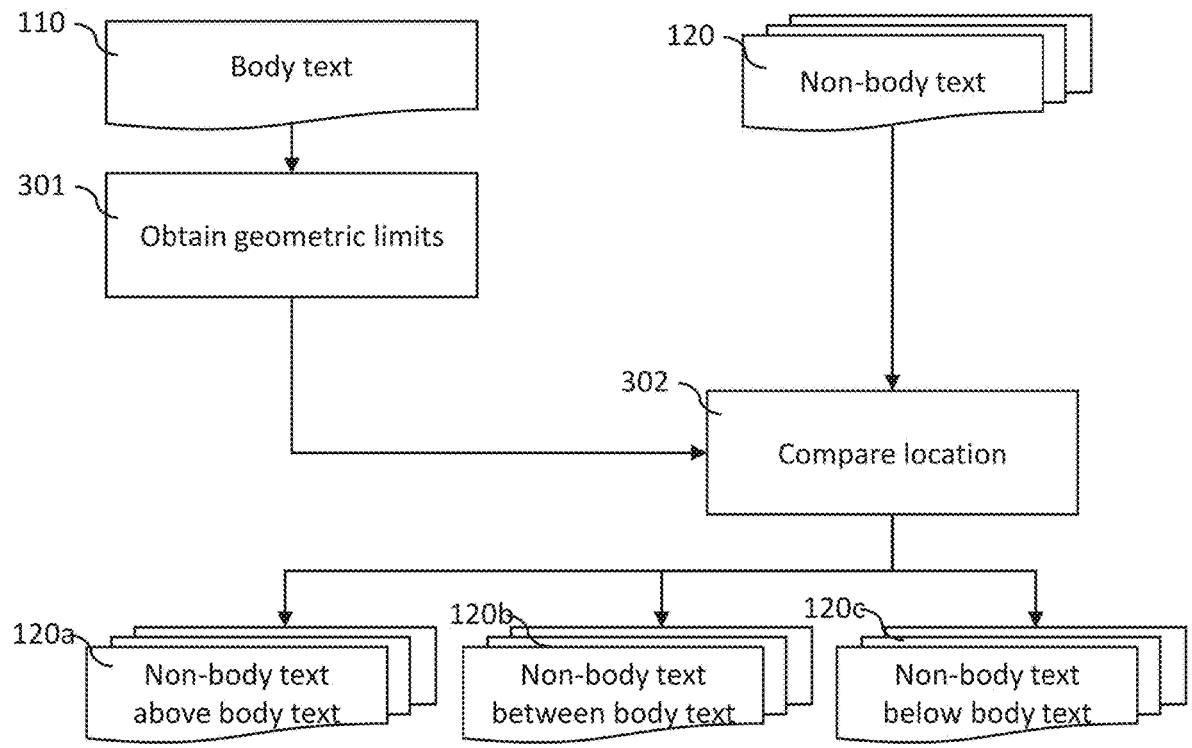
FIG. 7 illustrates classification of non-body text based on the geometric location of the non-body text blocks

FIG. 7 illustrates classification of non-body text based on the geometric location of the non-body text blocks. Geometric limits of body text blocks are obtained in phase 301. Geometric limits indicate the geometrical location of the body text block on a page of the original PDF document. The geometric limits of a body text block may be obtained for example based on the geometric location information stored in association with the geometrical order and/or the raw text order. If only the geometric location of rows was determined in the step 205, the obtaining of the geometric limits of a text block may include determining the geometric limits of a text block based on the geometric locations of the rows in the text block as disclosed in connection to step 205.

The geometric location of each non-body text block has been stored earlier as described in the phase 205 of to FIG. 6. This geometric location may now be used for comparing the geometric location of the non-body text block 120 to the geometric limits of the body text blocks 110 as illustrated with phase 302. The non-body text blocks may be first categorized into one of above body text 120*a*, between body text blocks 120*b* and below body text 120*c*.

The categorization based on location of the non-body text block may be illustrated as a first phase of the process of defining semantical roles of the non-body text blocks. This location-based categorization may be combined with further decision phases to define the actual semantic role.

Figure 8:
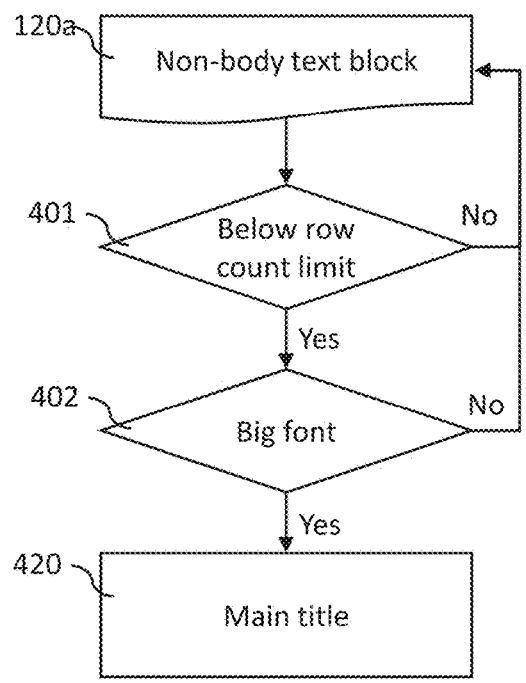
FIG. 8 illustrates a first exemplary set of decisions made for semantically classifying a non-body text block

FIG. 8 illustrates a first exemplary set of decisions made for semantically classifying a non-body text block 120*a*, residing above all body text blocks. If the non-body text block does not exceed a set row count limit (401), for example that the non-body text block has no more than three rows, and it has a font that exceeds a big font size limit (402), it can be classified as a main title in the phase 420. The big font size limit may define that the font should be at least three times greater than font in any other text blocks on the page. On the other hand, the font size limit may be defined based on the content of the page: the font size should be greater than in any block that has more than three rows. If either the row count or the font size requirement is not fulfilled, the non-body text block 120*a* may be returned among those not semantically classified and tested against requirements set for other semantical roles.

Figure 9:
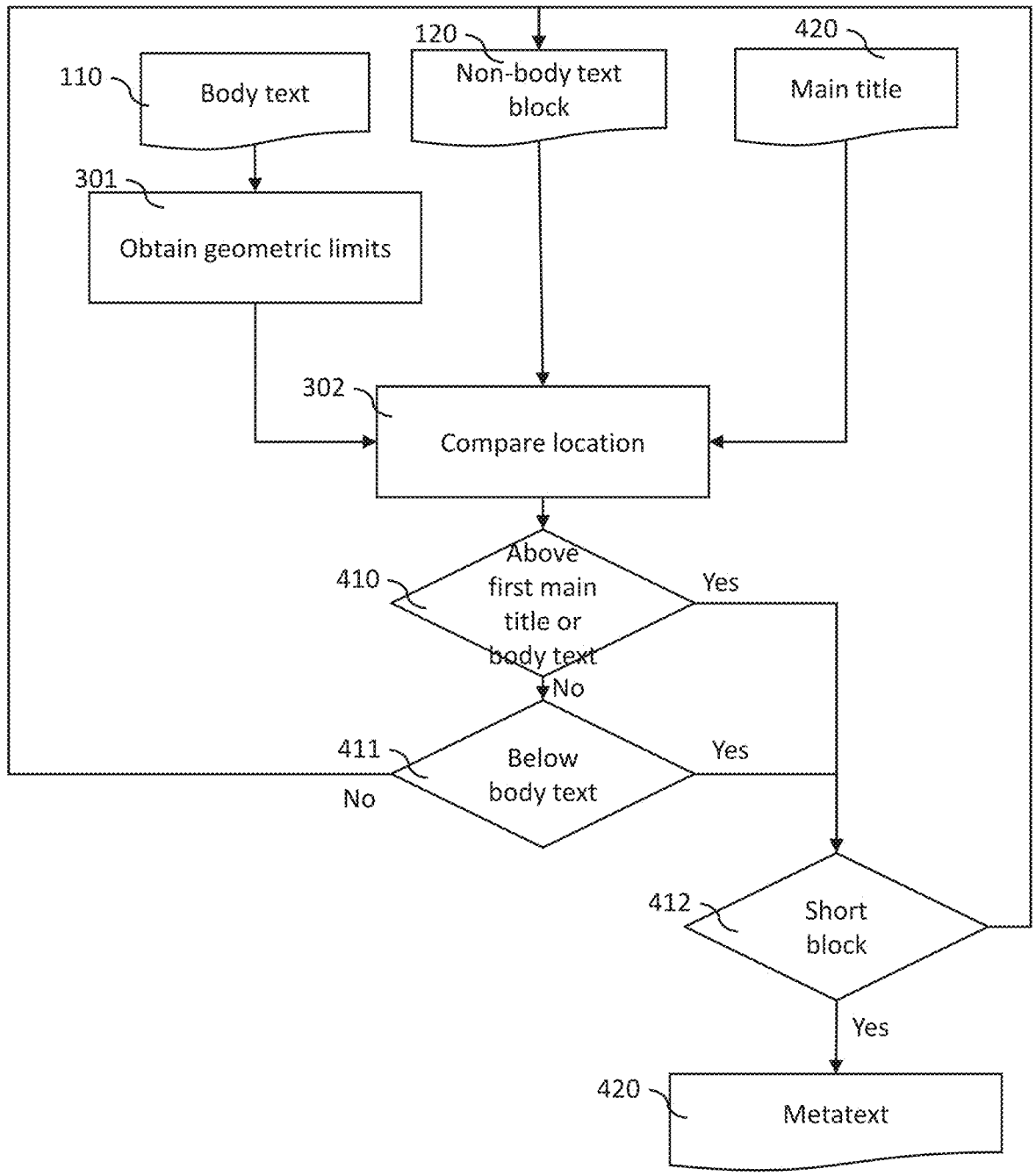
FIG. 9 illustrates second exemplary set of decisions made for semantically classifying a non-body text block.

FIG. 9 illustrates second exemplary set of decisions made for semantically classifying a non-body text block 120. The location of the non-body text block 120 is compared to the outer limits of the body text blocks 110 and also to that of the upmost main title 420 appearing first on the page, if there is one. If the non-body text block 120*a* is considered short (decision box 412), which in this case refers to that it has only one or very few rows, and the non-body text block is disposed either a) above all body text blocks 110 and also above the first main title 420 or just above all body text blocks on the page if there is no main title 420, as illustrated with decision box 410 or b) below the body text blocks, as illustrated by decision box 411, the non-body text block 120a may be semantically classified as metatext 420. It should be noticed that the block length decision in the phase 412 may be performed at any phase, i.e. before, between or after phases 410 and 411. Also order of phases 410 and 411 may be shifted without departing from the embodiment. If any of the above conditions are not fulfilled, the non-body text block 120a may be classified as normal body text block 110. In some exemplary occasions, such text blocks comprise various titles in connection to informational graphics, or for example a list of contact information. In such case, the rows are preferably not combined into a single text block without line breaks, but the line break information is kept within the text block.

When processing raw body text and/or body text for combining the text flow, paragraph breaks are marked within text blocks and other line breaks are removed for combining the text into the continuous text flow. The process should take into account font size, hyphens, punctuation marks, row lengths deviating from the typical row length, indentations, as well as bold and italic fonts.

Titles, lists, tables, ordered or unordered lists, and other pre-formatted texts may also be identified among the raw body text.

A non-body text block may be classified as a caption, when it is disposed immediately below a figure. A text block may be considered disposed immediately below a figure for example, if the center of the x-coordinates of the text are directly below a figure, and the distance of the upper edge of the text block from the figure is less than a predefined distance limit value. For example, the distance limit value may be 1.5 times the row height. Alternatively, or in addition, the criteria for determining a text block as a caption may include that both sides of the text block shall reside between the lateral limits of the image, or that the sides of the text block may exceed the lateral limits of the image by at most a predefined percentage.

A non-body text block may be classified as a citation, if the length of the text block is at least three rows, font in the text block is bigger than the font used in the typical body text, and if there are not more than two text blocks with the same font on the page.

A text block may be classified as an intermediate title, if the text block starts with a capital letter or other letter that is not a lower-case letter, if the font is greater than the average font or the font size is equal to the average font, but the font is bold, and the text block ends without a point, a comma or a hyphen. Further, a text block that is long, for example more than 3 rows, is likely not an intermediate title. A further criterion for determining that a text block is not an intermediate title may be, that the first row of the next text block should not begin with a lower-case letter.

Both body and non-body text block may be classified as an unordered list, if more than one rows in the text block begins with a bullet. Bullets may be predefined, or then a repeating special character may be recognized to be a bullet, if it deviates from the alphabets used in the text block and is only used in the beginning of rows.

Both body and non-body text block may be classified as a ordered list, if more than one rows in the text block begins with a number or with a combination of a number and other marks of the currently used alphabet, and these numbers are consecutive.

Both body and non-body text block may be classified as a table, if there is empty space in at least one same position on each row of the block of at least three consecutive rows.

Both body and non-body text block may be classified as preformatted text, if font in the text block is of monospace type, and such monospace font is not very common on the page. A text block may be also classified as preformatted text if the text block comprises typical structures of a programming language, such as dots, brackets or like with no white space in the middle of the words.

If no specific reason is found for classifying a text block into a special semantical group, it may be classified as normal body text.

The method disclosed above may be performed by a data-processing device or system. The data-processing device may comprise a computer. The data-processing system may comprise one or more computers, one or more data processors, one or more memories and interconnections thereof. The computer program product may be stored on a computer-readable medium. Thus, the computer-readable medium has stored thereon instructions which, when executed by a computing device or system, cause the computing device or system to perform the method steps.

The method described above may be performed fully automatically based on data and parameters obtained from the electronic document utilizing predefined decision criteria. Alternatively, preforming some of the critical steps of the method, such as combining text blocks, may be supported by a human user. The user may, for example, be requested to approve combining two text blocks especially if the proposed combination occurs over text blocks originally residing on different pages or in different columns. The user may also be requested to approve proposed classifications and pre-classifications, and allowed to change such text block classification proposals. A user interface may be provided by the computer program, which enables the user to supervise the performance of the method, receive requests and perform the requested actions.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A computer implemented method for analyzing contents of a page of a vector graphic format file, the method comprising:
dividing text content on the page into text blocks;
defining geometrical location of each text block, the geometrical location comprising at least upper and lower geometrical limits of the text block defined on basis of geometrical location information of first and last text rows included in the text block;
developing a statistical model, wherein the statistical model comprises information on a typical row length and a typical deviation from the typical row length appearing on at least one entire page of the vector graphic format file;
pre-classifying each text block to be one of a raw body text block and a non-body text block by comparing characteristics of the respective text block with the statistical model, wherein the comparing comprises:
defining, for each row of text in a text block, a probability whether the row is part of body text;
defining a probability of the text block to be part of the body text on basis of probabilities of all rows of text in the text block; and
if the text block fulfills all criteria defined for the body text, pre-classifying the text block as the raw body text block, and if not, pre-classifying the text block as the non-body text block, processing raw body text blocks to form a plurality of body text blocks with defined geometrical limits defined based on the geometrical location of the raw body text blocks;

combining the plurality of body text blocks into a text flow comprising the plurality of body text blocks;

defining a semantical role of each of one or more non-body text blocks;

combining in a geometrical order the one or more semantically defined non-body text blocks among the plurality of body text blocks of the text flow; and providing result data formatted as any one of a data structure and a data stream, the result data comprising a reconstruction of the text content of the page with semantic classification of paragraphs and an indicative reading order, wherein a raw text order that corresponds to unprocessed text rows in order of appearance in a source code and a geometrical order defined by order of appearance of the geometrical location of the text block in the vector graphic format file are defined prior to pre-classification, the statistical model further comprises information on a typical font, defined on basis of most commonly used font on any one of the page or on the row or rows representing the typical row length, and the text block is pre-classified as the non-body text block when any one of:

order of appearance of two consecutive rows in the geometrical order differs from the order of appearance of the rows in the raw text order and the rows in the text blocks before and after the text block are consecutively arranged in the raw text order;

font of the text block is different from the typical font of the page; and at least one row of the text block is significantly longer than the typical row length.

2. The method according to claim 1, wherein the pre-classifying text blocks further comprises, for each text block:

defining the geometrical location of the text block on basis of geometrical locations of text rows in the text block; and storing the geometrical location of the text block.

3. The method according to claim 1, further comprising:

classifying the plurality of body text blocks of the text flow; and if any one of the plurality of body text blocks is recognized as the non-body text block during the classifying, moving the respective non-body text block to be handled as one of the one or more non-body text blocks.

4. The method according to claim 1, wherein the combining the body text blocks into the text flow comprises:

marking paragraph breaks within the plurality of body text blocks;

removing line breaks from the plurality of body text blocks; and recognizing paragraphs split to two different body text blocks and moving any such split paragraphs to either one of the two body text blocks.

5. The method according to claim 1, wherein in case a first body text block is detected to be incomplete, and it cannot be combined to another body text block on a current page, the method further comprises:

comparing the first body text block to at least one second body text block of at least one of a preceding text flow, a following text flow, a preceding page and a following page, and if a matching second body text block is found, combining the first body text block and the matching second body text block.

6. The method according to claim 5, wherein a confirmation is requested from a user prior to combining the text blocks.

7. The method according to claim 1, wherein the method further comprises:

defining upper and lower geometrical limits of the plurality of body text blocks, and using coordinate comparisons with these limits for the semantical classification of non-body text blocks.

8. The method according to claim 1, wherein each non-body text block is classified into any one semantic class of:

a main title;
a subtitle;
a caption;
a citation;
metatext;
a page number;
a table;
an unordered list;
an ordered list;
pre-formatted text; and
a normal non-body text block, if the non-body text block is not classified as any of the above.

9. The method according to claim 1, wherein a text block is pre-classified as a non-body text block when it fulfils at least one of following criteria:

font size is different from a size of the typical font;

the text block comprises at least one row which have a significantly longer row length than the typical row length;

font type of the text is different from the typical font on the page;

order of appearance of two consecutive text rows in the geometrical order differs from the order of appearance in the raw text order and rows in the text blocks before and after the text block are consecutively arranged in the raw text order; and length of all rows within the text block is smaller than a median text row length, but a column width is not restricted on both sides by a margin or a visible object such as an image, a geometric object or text, and a first row of the text block does not begin with a lower-case letter, and a last row of the text block does not end with a lower-case letter or a hyphen, and the text block is pre-classified as a raw body text block if none of the above criteria is fulfilled.

10. A data-processing device comprising one or more computers for carrying out the method according to claim 1.

11. A computer program product embodied on a non-transitory computer readable medium, comprising instructions stored thereon, which instructions, when executed by a data-processing device or system cause the data-processing device or system to perform the method according to claim 1.

* * * * *